United States Patent
Laine et al.

(10) Patent No.: US 11,891,047 B2
(45) Date of Patent: Feb. 6, 2024

(54) METHOD FOR HAVING A VEHICLE FOLLOW A DESIRED CURVATURE PATH

(71) Applicant: VOLVO TRUCK CORPORATION, Gothenburg (SE)

(72) Inventors: Leo Laine, Härryda (SE); Karthik Ramanan Vaidyanathan, Hisings Backa (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 229 days.

(21) Appl. No.: 17/287,451

(22) PCT Filed: Oct. 22, 2018

(86) PCT No.: PCT/EP2018/078907
§ 371 (c)(1),
(2) Date: Apr. 21, 2021

(87) PCT Pub. No.: WO2020/083465
PCT Pub. Date: Apr. 30, 2020

(65) Prior Publication Data
US 2021/0387613 A1 Dec. 16, 2021

(51) Int. Cl.
*B60W 30/045* (2012.01)
*B60W 30/18* (2012.01)
(Continued)

(52) U.S. Cl.
CPC .......... *B60W 30/045* (2013.01); *B60W 10/20* (2013.01); *B60W 30/18172* (2013.01);
(Continued)

(58) Field of Classification Search
CPC ... B60K 28/165; B60W 30/045; B60W 10/20; B60W 30/18172; B60W 40/114;
(Continued)

(56) References Cited

U.S. PATENT DOCUMENTS

2003/0102713 A1* 6/2003 Murakami .............. B60T 8/322
303/146
2005/0283290 A1* 12/2005 Krimmel ............... B60W 10/20
701/41
(Continued)

FOREIGN PATENT DOCUMENTS

CN 101537835 A 9/2009
CN 102407846 A 4/2012
(Continued)

OTHER PUBLICATIONS

Translation of JP-4720998-B2, Sakukawa Jiyun, Steering Controller for Vehicle, Jul. 13, 2011, Toyota Motor Corp.*
(Continued)

*Primary Examiner* — Geepy Pe
*Assistant Examiner* — Kimia Kohankhaki
(74) *Attorney, Agent, or Firm* — Venable LLP; Jeffri A. Kaminski

(57) ABSTRACT

A method for having a vehicle follow a desired curvature path is provided. The vehicle has at least one differential with a differential lock connected to at least one driven wheel axle of the vehicle. The method includes providing information regarding state of the differential lock, the state being either that the differential lock is activated or unlocked, and when the differential lock is activated, calculating a yaw moment of the vehicle caused by the differential lock; and compensating for a deviation from the desired curvature path caused by the yaw moment such that a resulting steering angle is equal to or less than a maximum allowed steering angle of the vehicle. The compensation is a feed forward compensation.

17 Claims, 4 Drawing Sheets

(51) Int. Cl.
*B60W 40/114* (2012.01)
*B60W 10/20* (2006.01)
*B60W 10/16* (2012.01)

(52) U.S. Cl.
CPC .......... *B60W 40/114* (2013.01); *B60W 10/16* (2013.01); *B60W 2300/126* (2013.01); *B60W 2510/125* (2013.01); *B60W 2520/14* (2013.01); *B60W 2520/26* (2013.01); *B60W 2552/40* (2020.02); *B60W 2710/125* (2013.01); *B60W 2710/207* (2013.01); *B60W 2720/14* (2013.01)

(58) Field of Classification Search
CPC .......... B60W 10/16; B60W 2300/126; B60W 2510/125; B60W 2520/14; B60W 2520/26; B60W 2552/40; B60W 2710/125; B60W 2710/207; B60W 2720/14; B60W 60/001; B60W 2050/0012; B60W 2300/10; B60W 2300/12; B60W 2520/30; B60W 10/12; B60W 10/184; B60W 10/04
See application file for complete search history.

(56) References Cited

U.S. PATENT DOCUMENTS

| | | |
|---|---|---|
| 2009/0221392 A1 | 9/2009 | Bruce |
| 2010/0204887 A1* | 8/2010 | Ichinose ............ B60L 15/2036 701/41 |
| 2011/0307129 A1 | 12/2011 | Yu et al. |
| 2012/0283907 A1* | 11/2012 | Lee .................... B60T 8/17557 701/32.9 |
| 2014/0213412 A1* | 7/2014 | Marsh .................. B60W 10/20 477/35 |
| 2018/0162223 A1* | 6/2018 | Alfredson ............. B60K 17/16 |

FOREIGN PATENT DOCUMENTS

| | | |
|---|---|---|
| CN | 103978972 A | 8/2014 |
| DE | 10338656 A1 | 3/2005 |
| DE | 102004029783 A1 | 1/2006 |
| DE | 102007021257 A1 | 11/2007 |
| DE | 102006026188 A1 | 12/2007 |
| DE | 102014004946 A1 | 10/2015 |
| EP | 1059216 A2 | 12/2000 |
| EP | 1354748 A1 | 10/2003 |
| EP | 2832576 A1 | 2/2015 |
| JP | H07009978 A | 1/1995 |
| JP | 2001277896 | 10/2001 |
| JP | 2005067597 A | 3/2005 |
| JP | 2006008120 A | 1/2006 |
| JP | 2007239819 A | 9/2007 |
| JP | 2007321984 A | 12/2007 |
| JP | 2008232081 A | 10/2008 |
| JP | 2010173523 A | 8/2010 |
| JP | 4720998 B2 * | 7/2011 |
| JP | 5810692 B2 | 11/2015 |
| JP | 2018044580 A | 3/2018 |
| JP | 2018122734 A | 8/2018 |
| WO | 03064227 A1 | 8/2003 |
| WO | 2011052098 A1 | 5/2011 |

OTHER PUBLICATIONS

Japan Office Action dated Jan. 6, 2023 in corresponding Japan Patent Application No. 2021521986, 7 pages.
International Search Report and Written Opinion dated Nov. 5, 2019 in corresponding International PCT Application No. PCT/EP2018/078907, 17 pages.
Korean Office Action dated Jul. 26, 2023 in the corresponding Korean Patent Application No. 10-2021-7015485, 15 pages.
Chinese Office Action dated Aug. 1, 2023 in corresponding Chinese Patent Application No. 201880098834.7, 7 pages.

* cited by examiner

METHOD FOR HAVING A VEHICLE FOLLOW A DESIRED CURVATURE PATH

CROSS-REFERENCE TO RELATED APPLICATIONS

This application is a U.S. National Stage application of PCT/EP2018/078907, filed Oct. 22, 2018, and published on Apr. 30, 2020, as WO 2020/083465 A1, all of which is hereby incorporated by reference in its entirety.

TECHNICAL FIELD

The present invention relates to a method for having a vehicle follow a desired curvature path, wherein the vehicle comprises at least one differential with a differential lock connected to at least one driven wheel axle of the vehicle. Further, the present invention relates to a control unit comprising the method, a vehicle, a computer program comprising means for performing the steps of the method and to a computer readable medium carrying a computer program comprising program code means for performing the steps of the method.

The invention can be applied in heavy-duty vehicles, such as trucks, buses and construction equipment. Although the invention will be described with respect to a truck, the invention is not restricted to this particular vehicle, but may also be used in other vehicles, such as passenger cars.

BACKGROUND

Steering, braking and propulsion of vehicles are generally controlled by drivers of the vehicles. In today's modern vehicles, including trucks, buses etc., drivers may also be assisted by driver assistance systems, such as lane keeping assistance systems, braking assistance systems etc.

One example of such a system may be found in US 2005/0283290 A1, which relates to a process for influencing the steering behaviour of a motor vehicle that has at least one differential lock and a steering system with which the first yawing moment can be generated, as well as a supplemental angle, which can override the driver steering angle and with which a second yawing moment can be generated. Hereby, the supplemental angle can be calculated and a second yawing moment can be generated that compensates for the first yawing moment.

Due to the rapid development of more advanced vehicles, including semi-autonomous and fully autonomous vehicles, there is however a strive towards further improving automation of vehicle steering functions.

SUMMARY

In view of the above, an object of the invention is to provide an improved method for having a vehicle follow a desired curvature path, and/or a control unit for controlling a vehicle to follow a desired curvature path, and/or a vehicle.

According to a first aspect, the object is achieved by a method. According to a second aspect, the object is achieved by a control unit. According to a third aspect, the object is achieved by a vehicle. According to a fourth aspect, the object is achieved by a computer program. According to a fifth aspect, the object is achieved by a computer readable medium.

According to the first aspect thereof, the object is provided by a method for having a vehicle follow a desired curvature path, the vehicle comprising at least one differential with a differential lock connected to at least one driven wheel axle of the vehicle, the method comprising at least the following steps:

providing information regarding a state of the differential lock, the state being either that the differential lock is activated or unlocked, and when said differential lock is activated:

calculating a yaw moment, Mdiff, of the vehicle, caused by the differential lock; and compensating for a deviation from the desired curvature path caused by the yaw moment, Mdiff, such that a resulting steering angle is equal to or less than a maximum allowed steering angle of the vehicle, whereby the compensation is a feed forward compensation.

By the provision of the above method, improved following of a desired curvature path of a vehicle is provided. More particularly, it has been found that compensating for a yaw moment caused by a differential lock in a feed forward manner will allow the vehicle to better follow the desired curvature path. Hence, the resulting steering angle may be optimized for following a desired curvature path and not only for compensating a yaw moment caused by the activated differential lock.

Optionally, the method may further comprise the step of: calculating a total desired yaw moment, $M_z$, by calculating a vehicle curvature yaw moment, $M_{z\_curvature}$, for said desired curvature path (C1), wherein said total desired yaw moment, $M_z$, is defined as $M_{z\_curvature} M_{diff}$ and wherein the resulting steering angle is provided by the total desired yaw moment $M_z$. Thus, in order to retrieve the resulting steering angle, both moments, $M_{z\_curvature}$ and $M_{diff}$ may need to be calculated when the differential lock is activated. Further, when the differential lock is unlocked, only the curvature yaw moment $M_{z\_curvature}$ may be needed for retrieving the resulting steering angle. In other words, in such situation $M_{diff}$ will be zero.

Optionally, the vehicle may be a semi-autonomous vehicle or a fully autonomous vehicle. It has namely been found that the method as defined in the above may be particularly suitable for such vehicles. A semi-autonomous vehicle means a vehicle where at least steering, and optionally at least one of braking and propulsion of the vehicle is controlled, continuously or intermittently, without direct human involvement, and a fully autonomous vehicle means a vehicle where all of steering, braking and propulsion of the vehicle is controlled, continuously or intermittently, without direct human involvement. In fact, the method may be particularly suitable for a vehicle where only a trajectory input in the form of a desired vehicle acceleration and curvature path for the vehicle exists, and where there is no driver input in the form of e.g. a steering wheel angle.

Optionally, the compensation may be performed in a force generation part of the vehicle, the force generation part being at least used for calculating desired forces and moments of the vehicle for controlling at least one of steering, braking and propulsion of the vehicle. Still optionally, the method may further comprise the step of providing the compensation as a feed forward compensation to a motion support device coordinator of the vehicle, the motion support device coordinator being used for controlling at least one of steering, braking and propulsion of the vehicle. Hence, by integrating the compensation in the force generation part of the vehicle and then forward the compensation to the motion support device coordinator, further improved and faster compensation may be provided. Otherwise the path error caused by the differential lock being activated may be solved by a feedback loop. This may however result in that the vehicle will deviate more from its desired curvature path than what will be achieved by the present invention. Further, the force generation part may also in a feed forward manner calculate request longitudinal force, $F_{x\_req}$, where the request longitudinal force may be calculated as the vehicle's mass times request acceleration, plus specific resistance forces. The resistance forces may be provided in feed forward manner to the motion support coordinator, i.e. in a similar manner as for the yaw moment $M_{diff}$. Resistance forces may for example relate to air resistance, road slope and vehicle roll. By including the resistance forces as feed forward part, the desired acceleration can be achieved more accurately. Similar logic is used for having the vehicle follow the desired curvature path. The force generation part and the motion support device coordinator are hence preferably used in semi and/or fully autonomous vehicles.

Optionally, the calculated yaw moment, $M_{diff}$, may be calculated based on at least one of the following parameters:
desired curvature path (C1), preferably said desired curvature path (C1) being based on a predicted path for vehicle automation,
vehicle speed in a vehicle coordinate system,
vehicle speed in a wheel coordinate system,
wheel speed of wheels connected to the at least one driven wheel axle,
wheel radii of the wheels connected to the at least one driven wheel axle,
normal forces exerted on the wheels connected to the at least one driven wheel axle,
friction coefficient of the wheels connected to the at least one driven wheel axle, and
trackwidth of the vehicle.

Optionally, the method may further comprise the step of:
activating the at least one differential lock connected to the at least one driven wheel axle when a slip value is identified relating to slip of at least one wheel connected to the at least one driven wheel axle, which slip value is equal to or above a predetermined slip threshold value.

Optionally, when the vehicle is running on a low friction surface having a friction coefficient being below a friction coefficient threshold value and when the at least one differential lock is activated, the at least one differential lock may be continued to be activated when an identified slip of at least one wheel connected to the at least one driven wheel axle is lower than a slip limit, which slip limit is preferably larger than a peak slip of the low friction surface. Thereby, the differential lock may be allowed to be activated for a longer period of time, providing improved traction for the vehicle for a longer time. Peak slip may be defined as the point where a maximum driving force on a wheel is acting thereon, whereafter the driving force will decrease and wheel slip will increase. Still optionally, the method may further comprise the step of:
unlocking the at least one differential lock connected to the at least one driven wheel axle when the identified slip is larger than the slip limit.

Optionally, when the vehicle is running on a high friction surface having a specific friction coefficient being above a friction coefficient threshold value and when the at least one differential lock is activated, the at least one differential lock may be continued to be activated if the sum of wheel forces of the wheels connected to the at least one driven wheel axle is lower than normal forces of the wheels times the specific friction coefficient. This means that the differential lock may be allowed to be activated for a longer time until there is a risk for rotational windup of the wheel axles. Still optionally, the method may further comprise the step of:
unlocking the at least one differential lock connected to the at least one driven wheel axle if the sum of wheel forces of the wheels connected to the at least one driven wheel axle is larger than normal forces of the wheels times the specific friction coefficient.

A low friction surface may be a surface comprising ice, snow, gravel, or the like. A high friction surface, may e.g. be an asphalt surface, concrete surface or the like, which also is not covered with ice, snow and/or gravel. A surface's friction coefficient may be measured and estimated e.g. during driving of the vehicle, and/or it may be provided from a database in or outside the vehicle. Friction estimation is well-known for the skilled person and will therefore not be described further in detail herein.

By controlling the at least differential lock as indicated in the above when running on a low friction and/or high friction surface, improved traction for longer time may be provided, until vehicle stability takes precedence. Optionally, the friction coefficient threshold value(s) as used for determining whether the surface is a low friction or high friction surface may be identical or different.

According to the second aspect thereof, the object is provided by a control unit for controlling a vehicle to follow a desired curvature path, the control unit being configured for performing the steps of any one of the embodiments of the method as described in the above. Advantages of the second aspect are analogous to the advantages provided by the method according to the first aspect. It shall also be noted that all embodiments of the first aspect are combinable with all embodiments of the second aspect, and vice versa.

According to the third aspect thereof, the object is provided by a vehicle comprising at least one differential with a differential lock connected to at least one driven wheel axle of the vehicle, and further comprising the control unit according to the second aspect. Advantages of the third aspect are analogous to the advantages provided by the method according to the first aspect. It shall also be noted that all embodiments of the first and second aspects are combinable with all embodiments of the third aspect, and vice versa.

Differentials and differential locks for vehicles are well-known mechanical components used for improving driving characteristics and traction of vehicles and will therefore not be further described herein.

Optionally, the vehicle may be a semi-autonomous or a fully autonomous vehicle.

Optionally, the vehicle may be any one of a truck, a heavy duty truck, a construction equipment vehicle or a bus.

Optionally, the vehicle may comprise at least one differential with at least two respective differential locks connected to least two respective driven wheel axles of the vehicle.

According to the fourth aspect thereof, the object is provided by a computer program comprising program code means for performing the steps of the method as described in the above, when the program is run on a computer.

According to the fifth aspect thereof, the object is provided by a computer readable medium carrying a computer program comprising program code means for performing the steps of the method as described in the above, when said program product is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
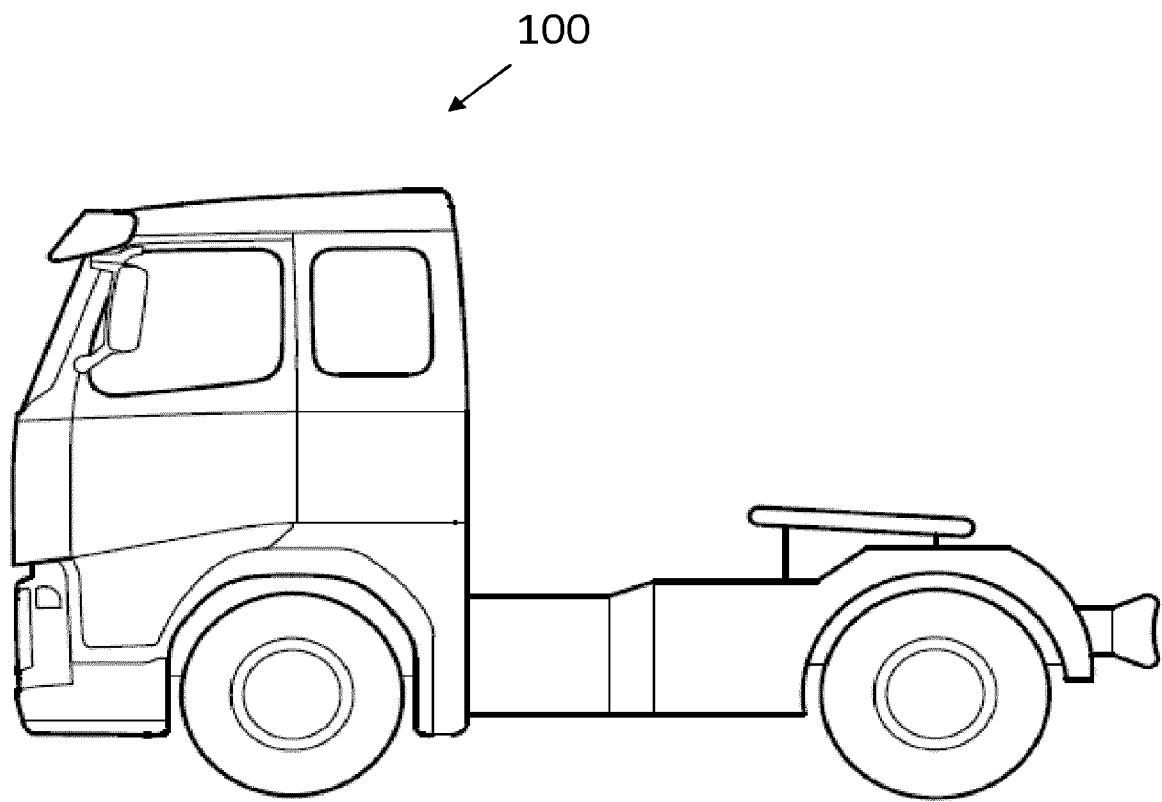
FIG. 1 depicts a vehicle in the form of a truck.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

FIG. 1 depicts a vehicle in the form of a truck 100 for which the method of the present invention advantageously may be implemented. The truck 100 as shown in FIG. 1 is a towing truck for towing trailers of different kind. Hence, the invention is applicable to vehicles and vehicle combinations, also known as articulated vehicle combinations. It shall however be noted that the present invention is not only usable for a truck, but could likewise be used also for other vehicles, such as buses, construction equipment, passenger cars etc., which vehicles comprise at least one differential with at least one differential lock.

Figure 2:
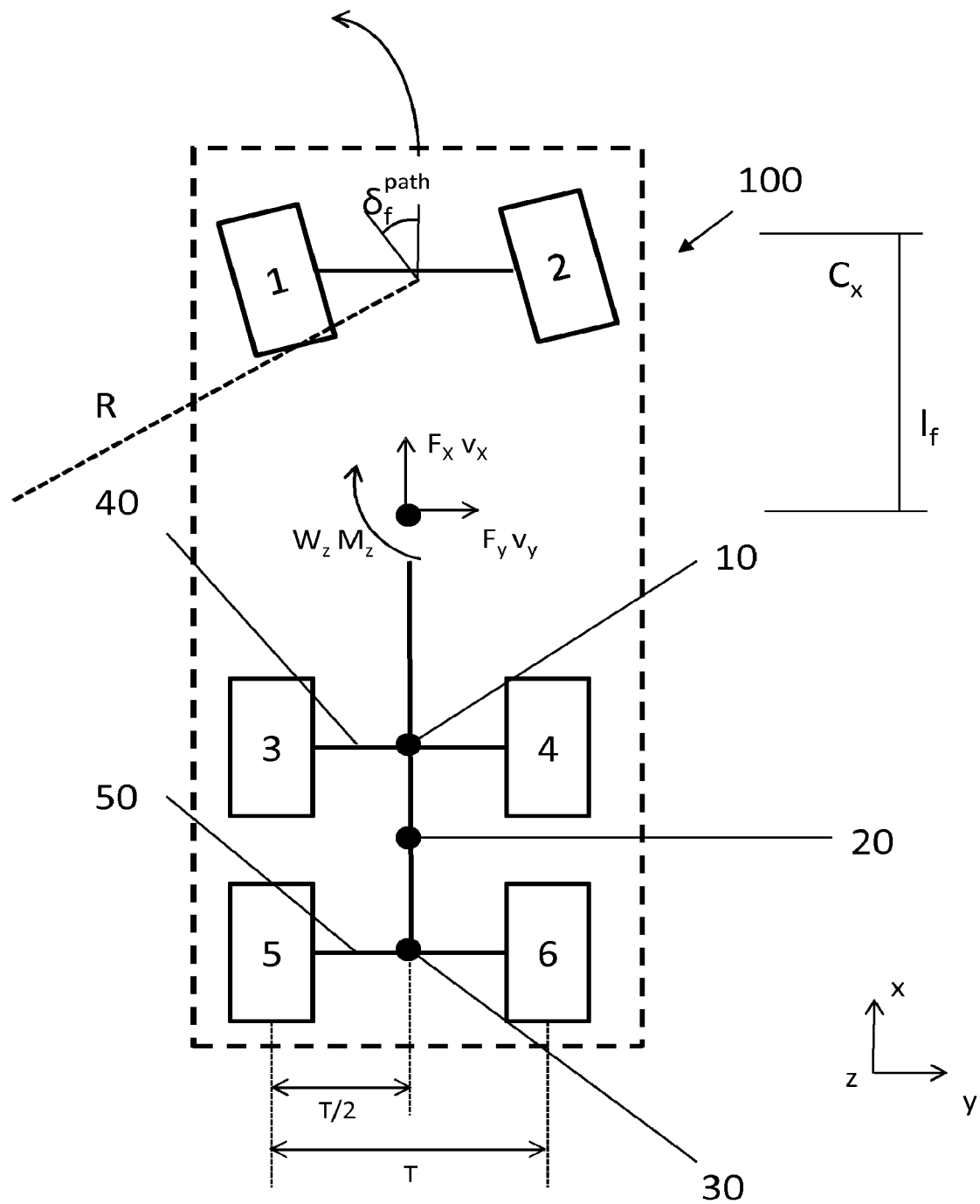
FIG. 2 depicts a schematic illustration of a vehicle.

FIG. 2 depicts a schematic illustration of a vehicle 100, e.g. a truck, seen from above. The vehicle 100 in this particular embodiment comprises two driven rear wheel axles 40 and 50. Two wheels 3 and 4 are connected to the first driven wheel axle 40 and two wheels 5 and 6 are connected to the second driven wheel axle 50. A first differential 10 is provided on the first wheel axle 40, a second differential 20 is provided between the two wheel axles, and a third differential 30 is provided on the second wheel axle 50. The differentials 10, 20 and 30 are provided with differential locks which can be selectively activated and unlocked.

An x-direction as provided herein corresponds to a longitudinal direction of the vehicle, an y-direction corresponds to a lateral direction of the vehicle and a z-direction corresponds to a vertical direction of the vehicle.

The vehicle 100 further comprises two front wheels 1 and 2 which can be angled in order to allow the vehicle to follow a curvature path. Further, the vehicle 100 has a certain track width T as seen in the figure.

Vehicle speed $v_{x,i}$ at each respective wheel can be calculated according to the two following equations, depending on if the wheel is provided on the left or right side of the vehicle:

$$v_{x,i}^{left} = v_x\left(\frac{R-T/2}{R}\right) \quad v_{x,i}^{right} = v_x\left(\frac{R+T/2}{R}\right)$$

where R is the curvature radius of the vehicle's path.

When the differential locks are activated, the angular speed of each driven wheel, 3 to 6, is the same, i.e. the following relation between the angular speed ($\omega$) of wheels can be expected:

$$\omega_{w,3} = \omega_{w,4} = \omega_{w,5} = \omega_{w,6}$$

Traction slip $\lambda_{w,i}$ each wheel may in turn be calculated by the following equation:

$$\lambda_{w,i} = \frac{\omega_{w,i} \cdot R_w - v_{x,i}}{\omega_{w,i} \cdot R_w}$$

where $R_w$ is the wheel radius for each wheel.

Figure 7:
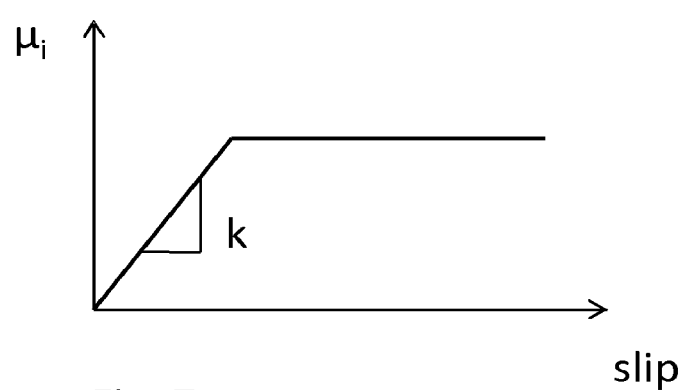
FIG. 7 shows an example of a constant value k.

From this, force contribution from the differential lock at each wheel may be calculated according to the following equation:

$$F_{x,i}^{diff} = \min(k \cdot \lambda_{w,i}, \mu_i \cdot F_{z,i})$$

where k is a constant defined as surface friction coefficient divided by traction slip, as shown in e.g. FIG. 7, where $\mu_i$ is the friction coefficient at the respective wheel and where $F_z$ is the normal force acting in the z-direction. $\mu_i$ may be defined by $F_x/F_{zi}$.

The yaw moment, $M_{diff}$ caused by the at least one differential lock may be calculated as the sum of wheel forces times half the track width T, i.e.:

$$M^{diff} = \sum_{i=3}^{6} F_{x,i} \cdot T/2$$

Desired forces and moments for controlling the vehicle 100 may be defined as $$V_{req} = [F'_x, F'_y, M_z]$$

where $F_x$ may be defined as:

$$F_x = m \cdot a_x^{req}$$

where m is the vehicle's mass and $a_{x,req}$ is the acceleration in the x-direction;

where $F_y$ may be defined as:

$$F_y = \delta_f^{path} \cdot 2c_\alpha$$

where $\delta_{f,path}$ is the actual steering angle and $C_\alpha$ is tire cornering stiffness, also known as lateral slip stiffness of the vehicle; and where the total desired yaw moment $M_z$ may be defined as: $M_z = M_{z\_curvature} + M_{diff}$. In more detail, the total desired yaw moment $M_z$ may be defined as:

$$M_z = \delta_f^{path} \cdot 2C_\alpha \cdot l_f + M^{diff}$$

where $l_f$ is the distance between the vehicle's centre of gravity on the x-axis and the front wheel axle of the vehicle where the wheels 1 and 2 are provided. Hence, $M_{z\_curvature}$ is here defined as:

$$\delta_f^{path} \cdot 2C_\alpha \cdot l_f$$

By calculating the forces and moments, $F_x$, $F_y$ and $M_z$, as in the above, the deviation from the desired curvature path caused by the yaw moment $M_{diff}$ can be compensated, preferably in the force generation part, such that a resulting steering angle is equal to or less than a maximum allowed steering angle of the vehicle. The maximum allowed steering angle may of course vary depending on the type of vehicle. For example, the maximum allowed steering angle may correspond to that the front wheels can be angled about ±75 degrees with respect to a forward direction of the vehicle. The force generation may take into account the yaw moment $M_{diff}$ caused by a locked, i.e. activated, differential, and hence compensate for the yaw to follow a desired curvature path by at least one of steering, braking at least one wheel and propulsion of the vehicle.

In the case when the vehicle 100 is running on a low friction surface having a friction coefficient being below a friction coefficient threshold value and when the at least one differential lock is activated, the at least one differential lock may be continued to be activated when an identified slip of at least one wheel connected to the at least one driven wheel axle is lower than a slip limit, which slip limit is larger than a peak slip of the low friction surface. Thereby, in such situation, the differential lock is continued to be activated when the following is fulfilled:

$$\lambda_{w,i} < \lambda_{lim}$$

Figure 6:
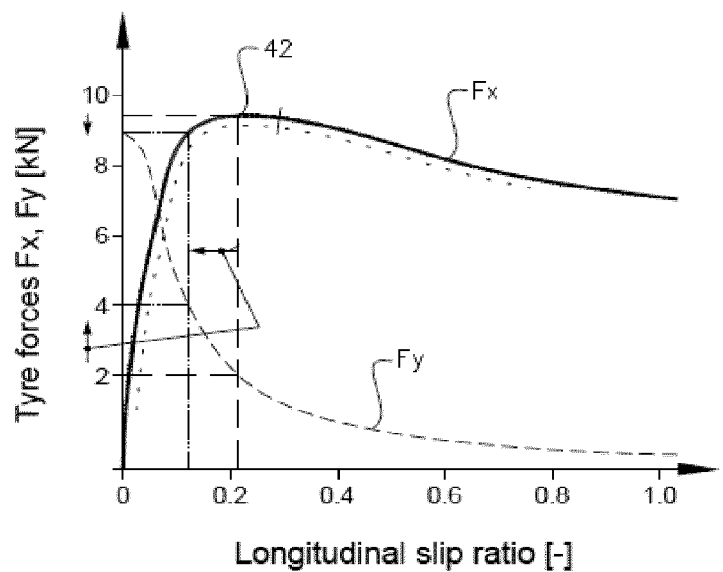
FIG. 6 shows an example of a peak slip value.

For example, $\lambda_{lim}$, may be a value such as 0.1-0.6, or 0.2-0.6, or 0.3-0.6, where $\lambda_{lim}$, is set to be larger than a peak slip of the low friction surface, and where 0 corresponds to no slip and 1 corresponds to full slip. An example of a peak slip is shown in FIG. 6, where it can be seen that the peak slip 42 occurs at a slip ratio of about 0.2. As mentioned in the above, the low friction surface may be a surface comprising ice, snow, gravel or the like. Further, the method may further comprise the step of unlocking the at least one differential lock connected to the at least one driven wheel axle when the identified slip is larger than the slip limit.

Further, in the case when the vehicle is running on a high friction surface having a specific friction coefficient being above a friction coefficient threshold value and when the at least one differential lock is activated, the at least one differential lock is continued to be activated if the sum of wheel forces of the wheels connected to the at least one driven wheel axle is lower than normal forces $F_z$ of the wheels times the specific friction coefficient. This means that the differential lock may be allowed to be activated for a longer time until there is a risk for rotational windup of the wheel axles. Thereby, in such situation, the differential lock is continued to be activated when the following is fulfilled:

$$\sum_{i=3}^{6} \mu F_{z,i} > \sum_{i=3}^{6} k\lambda_{w,i}$$

where $\mu$ is the specific friction coefficient of the surface and $F_z$ is the normal force. Further, the method may further comprise the step of unlocking the at least one differential lock connected to the at least one driven wheel axle if the sum of wheel forces of the wheels connected to the at least one driven wheel axle is larger than normal forces of the wheels times the specific friction coefficient.

Figure 3:
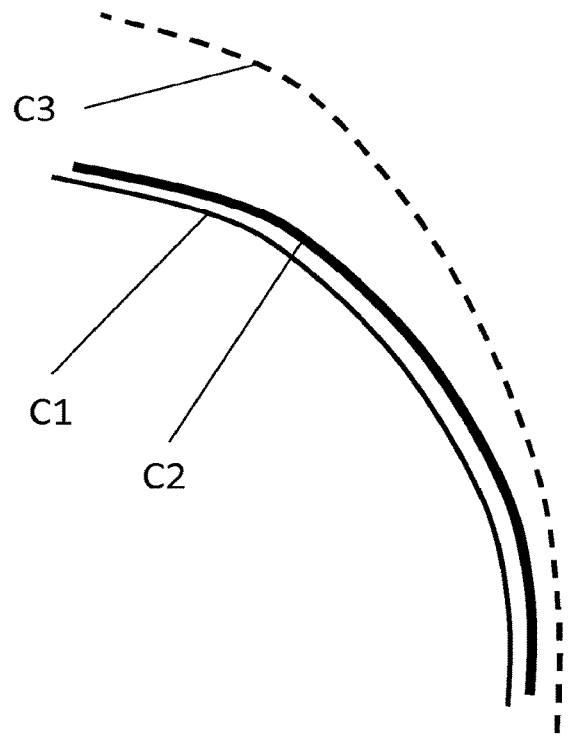
FIG. 3 depicts a curvature path of a vehicle.

FIG. 3 depicts the desired curvature path $C_1$ for the vehicle 100. It has been found that by controlling the resulting steering angle of the vehicle as disclosed herein, the vehicle will more closely follow the desired curvature path, indicated by the curvature $C_2$, rather than the curvature $C_3$ which shows the path the vehicle may take if no compensation was performed when the differential lock(s) is/are activated.

Figure 4:
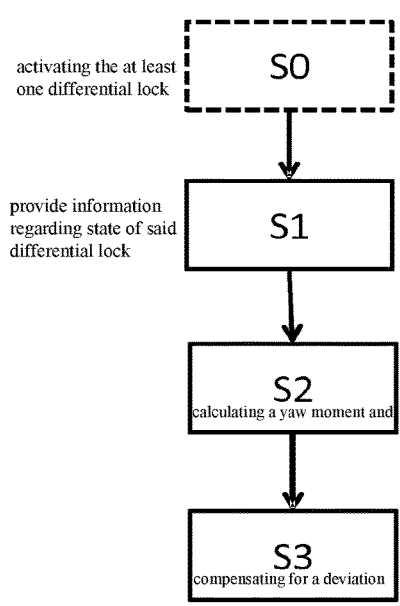
FIG. 4 depicts a flowchart of a method according to an example embodiment of the present invention.

FIG. 4, depicts a flowchart of the method of the present invention. Step S0 is optional, which is indicated in that the box is provided with dashed lines. The method may hence comprise the following steps:

S0, activating the at least one differential lock connected to the at least one driven wheel axle when a slip value is identified relating to slip of at least one wheel connected to the at least one driven wheel axle, which slip value is equal to or above a predetermined slip threshold value;

S1, providing information regarding state of the differential lock, the state being either that the differential lock is activated or unlocked, and when the differential lock is activated:

S2, calculating a yaw moment, $M_{diff}$ of the vehicle 100, caused by the differential lock; and S3, compensating for a deviation from the desired curvature path C1 caused by the yaw moment, $M_{diff}$ such that a resulting steering angle is equal to or less than a maximum allowed steering angle of the vehicle 100, whereby the compensation is a feed forward compensation.

Figure 5:
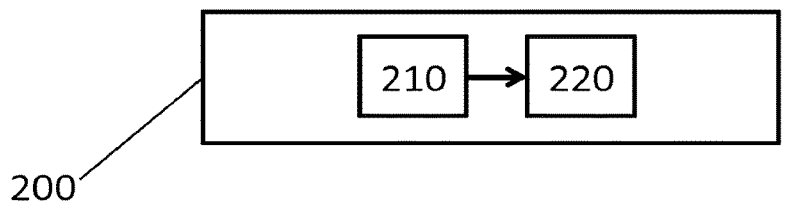
FIG. 5 depicts a control unit according to an example embodiment of the present invention.

FIG. 5 depicts a control unit 200 according to an example embodiment of the present invention. In this embodiment, the control unit is provided in an autonomous vehicle and comprises a force generation part 210 and a motion control device coordinator 220. Even though FIG. 5 indicates that the control unit 200 is provided as one unit, the same functionality could of course also be provided with several units located proximate to or distanced from each other. The control unit may for example comprise a processing unit and/or a memory unit. Still further, the control unit may comprise a computer program and/or a computer readable medium according to the invention. In this example, the compensation is provided as feed forward compensation from the force generation part to the motion support device coordinator.

It is to be understood that the present invention is not limited to the embodiments described above and illustrated in the drawings; rather, the skilled person will recognize that many changes and modifications may be made within the scope of the appended claims.

The invention claimed is:

1. A method for having a vehicle follow a desired curvature path, said vehicle comprising at least one differential with a differential lock connected to at least one driven wheel axle of said vehicle, said method comprising at least the following steps: providing information regarding a state of said differential lock, said state being either that said differential lock is activated or unlocked, and when said differential lock is activated: calculating a yaw moment, $M_{diff}$ of said vehicle, caused by said differential lock; and compensating for a deviation from said desired curvature path caused by said yaw moment, $M_{diff}$ where a resulting steering angle is equal to or less than a maximum allowed steering angle of said vehicle, whereby said compensation is a feed forward compensation.

2. The method according to claim 1, wherein the method further comprises the step of: calculating a total desired yaw moment, $M_{z}$, by calculating a vehicle curvature yaw moment, $M_{z\_curvature}$, for said desired curvature path, wherein said total desired yaw moment, $M_z$, is defined as $M_{z\ curvature} + M_{diff}$ and wherein the resulting steering angle is provided by the total desired yaw moment $M_z$.

3. The method according to claim 1, wherein said vehicle is a semi-autonomous vehicle or a fully autonomous vehicle.

4. The method according to claim 1, wherein said compensation is performed in a force generation part of said vehicle, said force generation part being at least used for calculating desired forces and moments of said vehicle for controlling at least one of steering, braking and propulsion of said vehicle.

5. The method according to claim 1, further comprising the step of providing said compensation as a feed forward compensation to a motion support device coordinator of said vehicle, said motion support device coordinator being used for controlling at least one of steering, braking and propulsion of said vehicle.

6. The method according to claim 1, wherein said calculated yaw moment, $M_{diff}$, is calculated based on at least one of the following parameters: desired curvature path, preferably said desired curvature path being based on a predicted path for vehicle automation, vehicle speed in a vehicle coordinate system, vehicle speed in a wheel coordinate system, wheel speed of wheels connected to said at least one driven wheel axle, wheel radii of said wheels connected to said at least one driven wheel axle, normal forces exerted on said wheels connected to said at least one driven wheel axle, friction coefficient of said wheels connected to said at least one driven wheel axle, and trackwidth of said vehicle.

7. The method according to claim 1, wherein said method further comprises the step of: activating said at least one differential lock connected to said at least one driven wheel axle when a slip value is identified relating to slip of at least one wheel connected to said at least one driven wheel axle, which slip value is equal to or above a predetermined slip threshold value.

8. The method according to claim 7, wherein when said vehicle is running on a low friction surface having a friction coefficient being below a friction coefficient threshold value and when said at least one differential lock is activated, said at least one differential lock is continued to be activated when an identified slip of at least one wheel connected to said at least one driven wheel axle is lower than a slip limit, which slip limit is preferably larger than a peak slip of said low friction surface.

9. The method according to claim 8, wherein said method further comprises the step of: unlocking said at least one differential lock connected to said at least one driven wheel axle when said identified slip is larger than said slip limit.

10. The method according to claim 7, wherein when said vehicle is running on a high friction surface having a specific friction coefficient being above a friction coefficient threshold value and when said at least one differential lock is activated, said at least one differential lock is continued to be activated if the sum of wheel forces of the wheels connected to said at least one driven wheel axle is lower than normal forces of said wheels times said specific friction coefficient.

11. The method according to claim 10, wherein said method further comprises the step of: unlocking said at least one differential lock connected to said at least one driven wheel axle if the sum of wheel forces of the wheels connected to said at least one driven wheel axle is larger than normal forces of said wheels times said specific friction coefficient.

12. A controller for controlling a vehicle to follow a desired curvature path said vehicle comprising at least one differential with a differential lock connected to at least one driven wheel axle of said vehicle, said controller being configured for performing:
providing information regarding a state of said differential lock, said state being either that said differential lock is activated or unlocked, and when said differential lock is activated: calculating a yaw moment, $M_{diff}$, of said vehicle, caused by said differential lock; and compensating for a deviation from said desired curvature path caused by said yaw moment, $M_{diff}$, where a resulting steering angle is equal to or less than a maximum allowed steering angle of said vehicle, whereby said compensation is a feed forward compensation.

13. The vehicle comprising at least one differential with the differential lock connected to at least one driven wheel axle of said vehicle, and further comprising said controller according to claim 12.

14. The vehicle according to claim 13, wherein said vehicle is a semi-autonomous or a fully autonomous vehicle.

15. The vehicle according to claim 13, wherein said vehicle is any one of a truck, a heavy duty truck, a construction equipment vehicle or a bus.

16. The vehicle according to claim 13, comprising at least one differential with at least two respective differential locks connected to least two respective driven wheel axles of said vehicle.

17. A non-transitory computer readable medium carrying a computer program comprising program code, when said program code is run on a computer, for performing:
providing information regarding a state of said differential lock, said state being either that said differential lock is activated or unlocked, and when said differential lock is activated: calculating a yaw moment, $M_{diff}$, of said vehicle, caused by said differential lock; and compensating for a deviation from said desired curvature path caused by said yaw moment, $M_{diff}$, where a resulting steering angle is equal to or less than a maximum allowed steering angle of said vehicle, whereby said compensation is a feed forward compensation.

* * * * *